(12) United States Patent
Keicher et al.

(10) Patent No.: US 10,130,961 B2
(45) Date of Patent: Nov. 20, 2018

(54) TWO-FLUID HYDRODYNAMIC PRINTING

(71) Applicant: National Technology & Engineering Solutions of Sandia, LLC, Albuquerque, NM (US)

(72) Inventors: David M. Keicher, Albuquerque, NM (US); Adam Cook, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 504 days.

(21) Appl. No.: 14/933,988

(22) Filed: Nov. 5, 2015

(65) Prior Publication Data

US 2016/0129634 A1 May 12, 2016

Related U.S. Application Data

(60) Provisional application No. 62/076,776, filed on Nov. 7, 2014.

(51) Int. Cl.
| | | |
|---|---|---|
| *B29C 64/209* | (2017.01) | |
| *B29C 64/245* | (2017.01) | |
| *B29C 64/357* | (2017.01) | |
| *B05B 7/06* | (2006.01) | |
| *B29C 67/00* | (2017.01) | |
| *B33Y 30/00* | (2015.01) | |
| *B29C 64/112* | (2017.01) | |
| *B29C 64/20* | (2017.01) | |

(52) U.S. Cl.
CPC ............ *B05B 7/06* (2013.01); *B05B 7/066* (2013.01); *B29C 64/112* (2017.08); *B29C 64/20* (2017.08); *B29C 64/209* (2017.08); *B29C 64/245* (2017.08); *B29C 64/357* (2017.08); *B29C 67/0059* (2013.01); *B29C 67/0085* (2013.01); *B33Y 30/00* (2014.12); *B29K 2039/06* (2013.01)

(58) Field of Classification Search
CPC .......... B05B 7/06; B05B 7/064; B05B 7/066; B05B 7/068; B33Y 30/00; B29C 64/209; B29C 64/245; B29C 64/357
See application file for complete search history.

(56) References Cited

U.S. PATENT DOCUMENTS

| | | | | |
|---|---|---|---|---|
| 4,876,040 A | * | 10/1989 | Park .................... | C08J 5/18 264/13 |
| 2014/0027952 A1 | * | 1/2014 | Fan ..................... | B05D 5/12 264/401 |
| 2014/0035975 A1 | * | 2/2014 | Essien; Marcelino .... | B41J 2/07 347/6 |

* cited by examiner

*Primary Examiner* — Yogendra N Gupta
*Assistant Examiner* — Joseph S Leyson
(74) *Attorney, Agent, or Firm* — Kevin W. Bieg

(57) ABSTRACT

Hydrodynamic focusing of two fluid steams provides a novel micro printing technology for printed electronics and other high performance applications.

6 Claims, 8 Drawing Sheets

TWO-FLUID HYDRODYNAMIC PRINTING

CROSS-REFERENCE TO RELATED APPLICATION

This application claims the benefit of U.S. Provisional Application No. 62/076,776, filed Nov. 7, 2014, which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to additive manufacturing and, in particular, to a method and apparatus for two-fluid hydrodynamic printing of electronic features.

BACKGROUND OF THE INVENTION

Printed electronics is an emerging area for additive manufacturing used to create electrical devices on various substrates. The appeal to directly print electronic features is driven largely by the advantages offered to reduce process steps, capital equipment costs and the need for product specific tooling. By addressing these points, Direct Write (DW) technologies offer the ability to produce low volume, high mix electronics at a per piece cost normally associated with large production volumes where economy of scale aids reducing part cost. There is continuous focus on providing the ability to print finer and finer features using the DW technologies.

One leading technology in the DW area is Aerosol Jet (AJ) printing technology wherein aerodynamic focusing is used to print features down to approximately 10 μm. The AJ process begins with the atomization of an ink, producing droplets approximately 1-2 microns in diameter. The atomized droplets are entrained in a gas stream and delivered to a print head. The combined gas streams exit the print head at high velocity through a converging nozzle that compresses the aerosol stream to a small diameter. The high exit velocity of the jet enables a relatively large separation, typically a few millimeters, between the print head and the substrate. Although the AJ technology has been demonstrated in a laboratory environment, several technical issues persist that limit the use of this technology for commercial applications. These issues include:
1. Shuttering—The mechanical shutter used for AJ printing limits its usefulness for conformal printing and has a tendency to eject excess ink collected in the shutter during printing onto the print surface. Shutter response time (approx. 10 ms) limits high speed processing capabilities.
2. Overspray—Both ultrasonic and pneumatic atomization (UA and PA, respectively) methods used for the AJ technology produce a poly dispersed aerosol. Aerodynamic focusing of poly dispersed aerosols leads to overspray on the edges of printed features since smaller droplets focus at a different plane than the larger droplets (an optical analogy is chromatic aberration).
3. Process Reliability—UA and PA generate aerosol with a broad droplet size distribution and the AJ process only uses the droplets at the small end of the distribution curve. Therefore, aerosol usage rate is less than 0.001%. As such, excess energy input to the ink changes ink characteristics over time and affects the output of the printer. Low volatility solvent-based inks can extend print time over high volatility solvent-based inks; however, in both cases total ink utilization is less than 10% before the ink is degraded. Note that there are many good inks that use volatile solvents. To offset this effect, solvent add back has recently been added to all commercial AJ systems. This requires tight temperature control and makes this system more complex.
4. Aerosol Transport—The physical sizes of the UAs and PAs necessitate mounting the atomizer some distance from the print head. Aerosol transport distance to the print head allows settling of the droplets causing clogging or pressure pulses in the transport lines. These pressure pulses affect the print quality.
5. Multiplexing Print Nozzles—AJ has had some success developing multinozzle print heads but, in addition to the above issues, individual nozzle shuttering and uniform aerosol distribution present additional challenges in scaling the AJ technology.
6. Material Output Rate—Aerosol theory shows that diffusion limits the number of droplets that can exist within a given space at any given time and that the number of droplets that can exist is independent of droplet size for the droplet range of interest to AJ printing. This limits the maximum output rate for AJ technology using current UA and PA technology.

Therefore, there remains a need for a direct write process that can overcome these problems for printed electronics.

SUMMARY OF THE INVENTION

The present invention is directed to an apparatus for two-fluid hydrodynamic printing, comprising a coaxial tube assembly, comprising an inner tube having an exit orifice for flowing an ink stream therethrough and an annular outer tube for flowing a sheath fluid therethrough wherein the sheath fluid has a higher velocity than the ink stream such that the ink stream is hydrodynamically focused by the outer sheath fluid upon exiting from the exit orifice of the inner tube. The apparatus can further comprise a focusing nozzle downstream from the exit orifice of the inner tube for further focusing of the ink stream therein. The apparatus can further comprise means for removing the sheath fluid from the ink stream downstream from the exit orifice of the inner tube and a recirculation channel for recirculating the removed sheath fluid. For example the ink can comprise polyvinylpyrrolidone and the sheath fluid can comprise water, alcohol, or a combination thereof. The focused ink stream can be deposited on a substrate.

Hydrodynamic focusing of two fluid streams provides a novel micro printing technology for electronics and other high performance applications. The unique print head geometry allows excess sheath fluid to be separated from the print flow stream for recycling/reuse. Fluid flow models suggest that >81% of the sheath fluid can be removed without affecting the print stream. Print results using two-fluid hydrodynamic focusing yielded a 30 μm wide by 0.5 μm tall line that suggests that the cross-section of the printed feature from the print head was approximately 2 μm in diameter. Printing results also demonstrated that complete removal of the sheath fluid is not necessary for all material systems. For example, hydrodynamic printing of two fluids enables printing of insulated conductors and clad optical interconnects.

BRIEF DESCRIPTION OF THE DRAWINGS

The detailed description will refer to the following drawings, wherein like elements are referred to by like numbers.

DETAILED DESCRIPTION OF THE INVENTION

Figure 1:
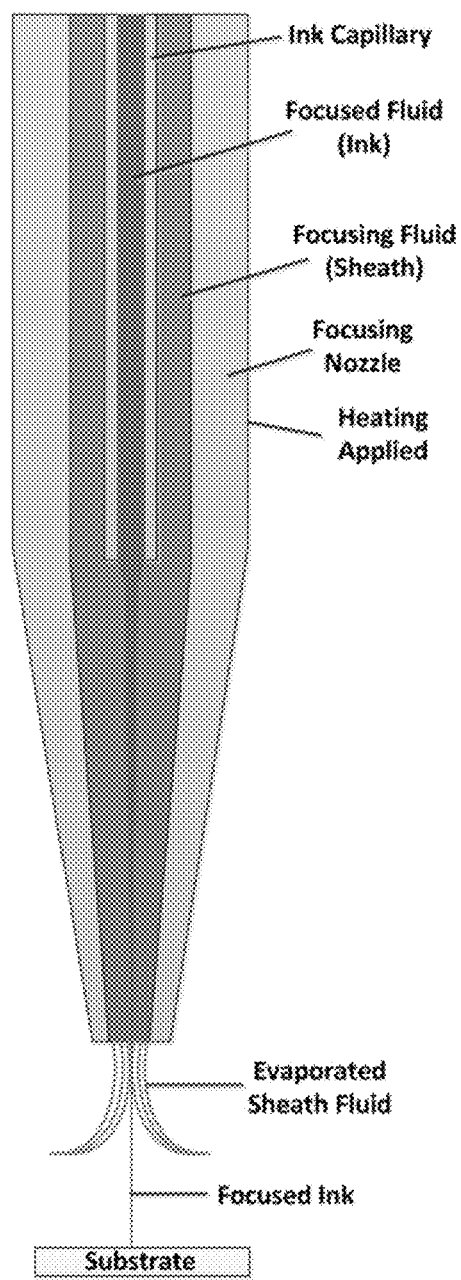
FIG. 1 is a schematic side-view illustration showing hydrodynamic focusing in coaxial tube assembly.

Many of the existing issues associated with AJ technology can be overcome with the use of a liquid jet printing method using hydrodynamic focusing. Hydrodynamic focusing of fluids occurs in microchannels when multiple fluids flow into the same channel and the flow rate of a focusing fluid is increased with respect to a focused core fluid. If the two fluids differ enough in their velocity (or density), they do not mix and form a two-layer stable flow. This effect is illustrated in FIG. 1, which shows hydrodynamic focusing in a coaxial tube assembly. Focused fluid (ink) is introduced into the coaxial tube via a central ink capillary. The focused fluid is injected at the end of the capillary into the middle of a sheath flow of a focusing fluid. Increasing the flow rate of the focusing fluid decreases the cross-sectional area of the core ink fluid causing focusing. The focusing effect can be further enhanced by flowing the two fluid streams through a converging focusing nozzle. Upon exiting the nozzle, the sheath fluid can be removed (e.g., evaporated) from the fluid stream prior to impacting onto the print substrate. In particular, the sheath fluid used for focusing the ink can be selectively vaporized with minimum impact to the core liquid jet. The focused ink can thereby be deposited on the substrate to create the desired features. Researchers in microfluidics have shown that wires as small as 400 nm in diameter can be produced using hydrodynamic focusing in microfluidic chambers. This phenomenon can be exploited to develop a novel printing technique which uses hydrodynamic focusing to print micron and submicron features.

The liquid jet has several advantages over its AJ counterpart. These advantages are:

1. Liquid jets are highly stable, providing uniform deposition.
2. Fluid output rate can be very high to allow small features to be printed quickly.
3. Liquids are incompressible allowing shuttering to occur in the fluid stream.
4. Microvalves are available to enable shuttering at greater than 1 kHZ, enabling high speed printing.
5. Liquid streams have very good edge definition enabling RF application.
6. Liquid jets can be highly focused to produce very fine features.
7. Printed fluid viscosity can have a wide range.
8. Printing of coaxial features can be enabled using two fluid flow.

Figure 2:
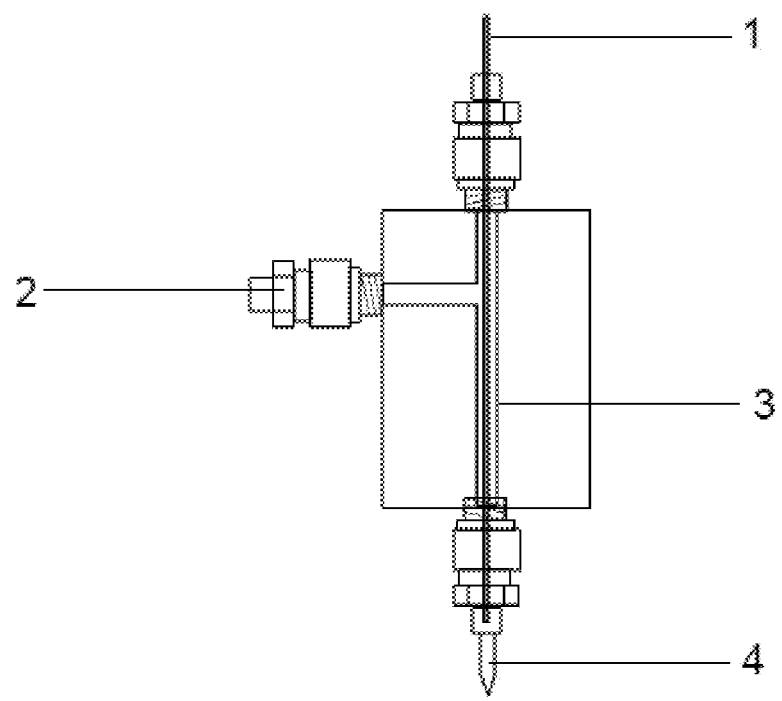
FIG. 2 is a schematic illustration of a liquid jet apparatus for developing coaxial sheath and ink flows.

Sheath fluid evaporation was examined using the liquid jet apparatus shown in FIG. 2. The geometric parameters for the apparatus features are given in Table 1. An initial study examined evaporation of a single-component jet consisting of the sheath fluid. The pressure in the apparatus was increased to 69 kPa above the local atmospheric pressure until jetting of the sheath fluid was observed. The temperature of the system was then increased until jet evaporation began. The sheath fluid was a solution of 91% isopropanol (IPA) in distilled water as described previously. The ink used was a 7% by volume solution of polyvinylpyrrolidone (PVP) in distilled water with green dye.

TABLE 1

Geometric parameters for liquid jet apparatus

| Item | Description |
|------|-------------|
| 1 | Ink input capillary (760 μm) |
| 2 | Sheath gas input |
| 3 | Main flow coaxial channel |
| 4 | Output nozzle (40 μm) |

Figure 3B:
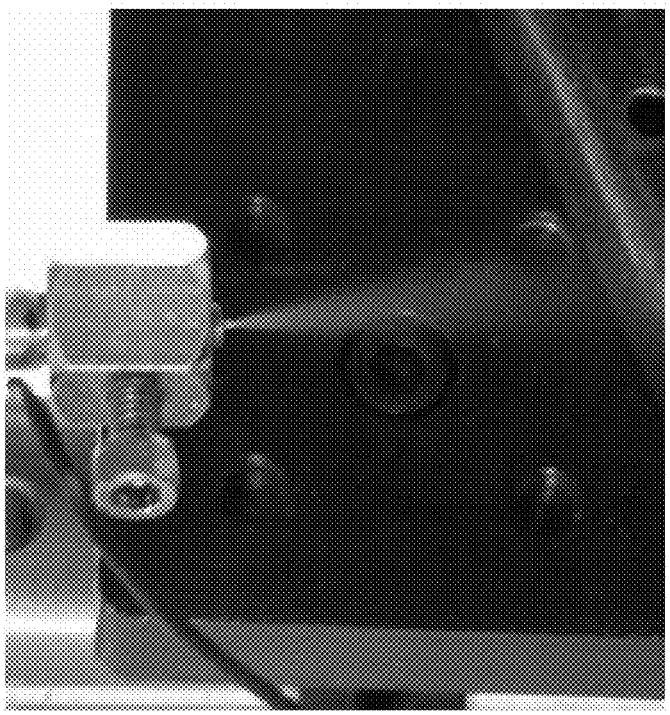
FIG. 3B is an image of sheath fluid evaporation for a fully evaporated fluid stream.
Figure 3A:
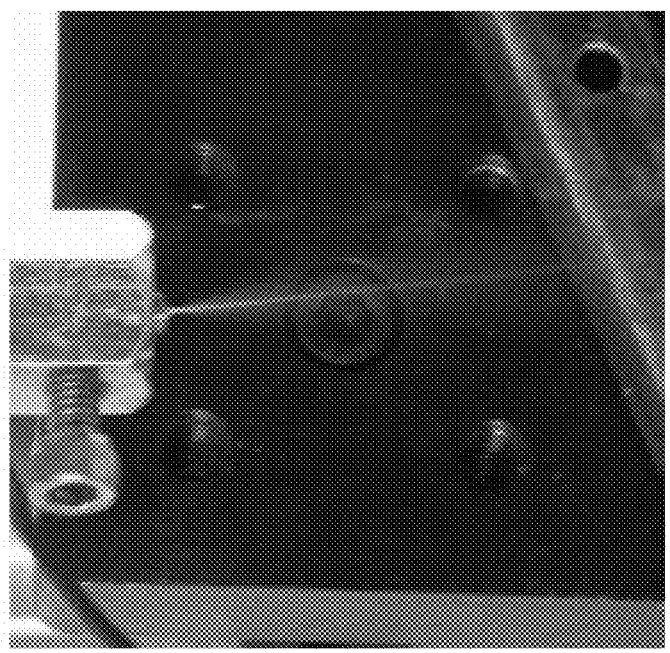
FIG. 3A is an image of sheath fluid evaporation for a partially evaporated liquid stream.

FIGS. 3A and 3B show real-time images of the sheath fluid evaporation from the liquid jet apparatus. FIG. 3A shows a partially evaporated jet, in which the outer layer of the liquid jet is evaporated, leaving a liquid core. FIG. 3B shows a completely evaporated jet. In both cases the flow from the jet is sporadic, askew from the normal, downward fluid flow direction. These experiments involving evaporation of only sheath fluid as it passed through a deposition head demonstrate that the sheath fluid used for focusing the ink can be selectively vaporized with minimum impact to the central core fluid to enable printing of micron/submicron features. However, as shown in the images in FIGS. 3A and 3B, in both cases of a partially evaporated jet and a fully evaporated jet, the mist or jet is ejected from the head at an angle that is skewed from the normally downward jet direction. This deviation is the result of trapped gas bubbles within the print head. Gas bubbles in the print head were produced when the heating caused vaporization of the sheath fluid in the head before the fluid exited the head. Additional heating of the head resulted in complete stoppage of the printing process where no fluid flow occurred.

Figure 4:
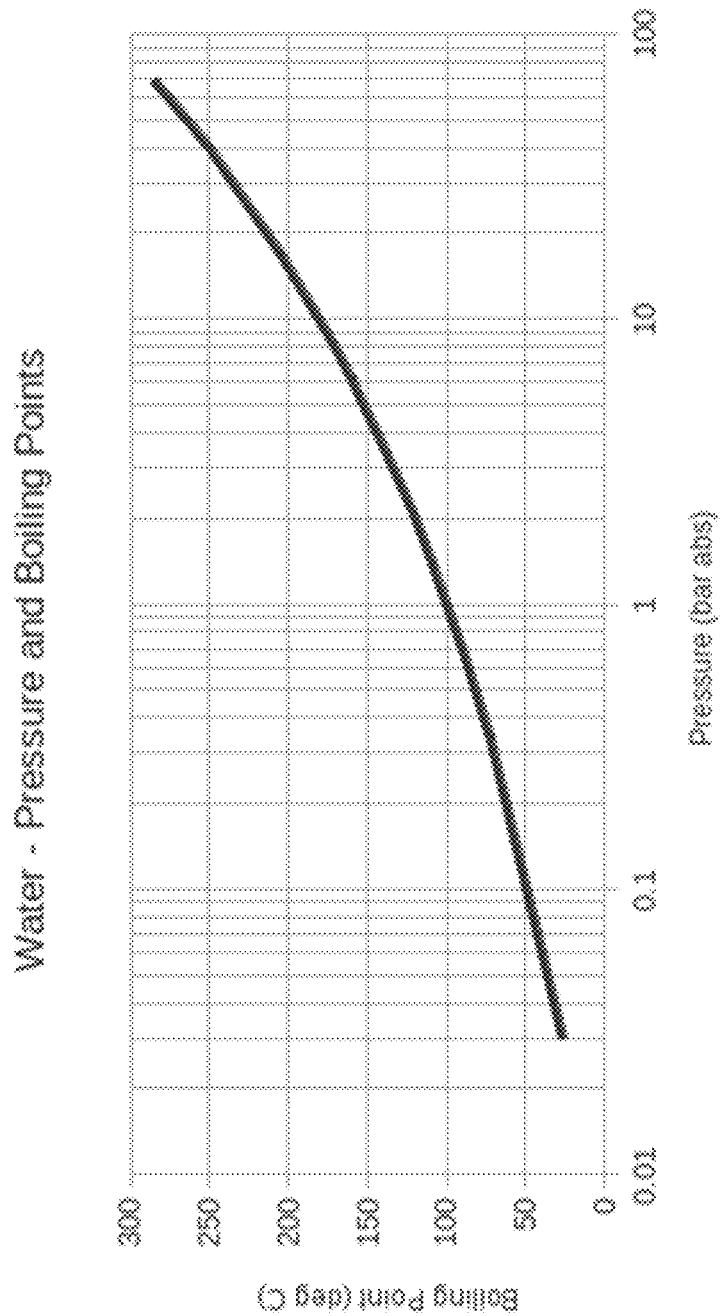
FIG. 4 is a graph of pressure versus boiling point curve for water (Ref: "The Engineering ToolBox; www.EngineeringToolBox.com").

These experiments suggest that in order to achieve full vaporization of the sheath fluid from the print head, the head would need to be heated to the point where vaporization was occurring inside of the head, which significantly affected the ability to print. If one considers the pressure versus boiling point curve shown in FIG. 4, increasing superheating would require the internal head pressure to be increased. Increasing the fluid flow rate in the head would increase the pressure but would also result in the need for more power to vaporize the increased fluid flow. Decreasing the exit orifice from the print head would also increase the internal head pressure which would affect the ability to further superheat the sheath fluid.

Figure 5:
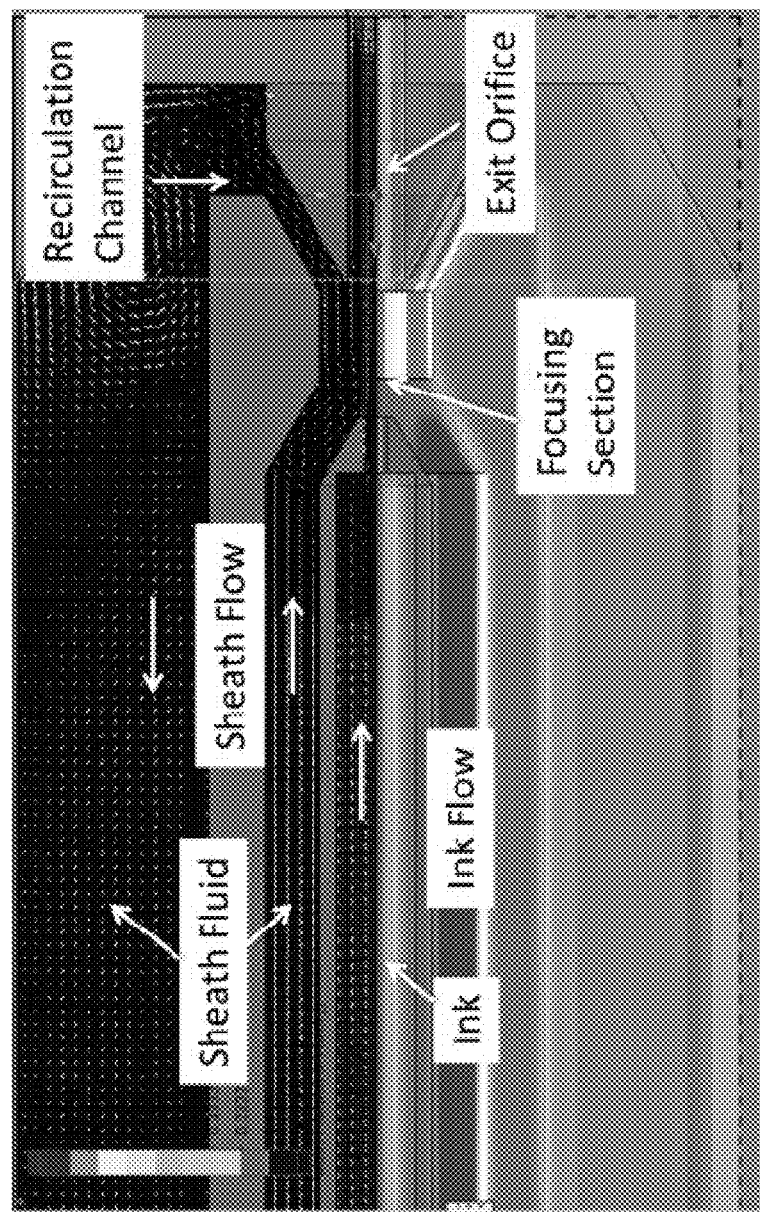
FIG. 5 is a cross-sectional side view of a print head geometry to minimize sheath vaporization requirements.

FIG. 5 shows an alternative print head design with enhanced ability to remove the sheath fluid. In this design, several features were added to the flow channel assembly to enhance the focusability of the ink and to significantly reduce the total volume of sheath fluid that is expended during the printing process. For this design, the sheath channel diameter transitions to a smaller diameter in a focusing section to maintain laminar flow. After focusing of the core ink flow occurs, the channel transitions back to a larger diameter to allow the sheath fluid to be removed from the print flow stream via a recirculation channel prior to the ink stream exiting the exit orifice of the print head. As such, only a fraction of the focusing sheath fluid must be evaporated as part of the printing process.

Figure 6:
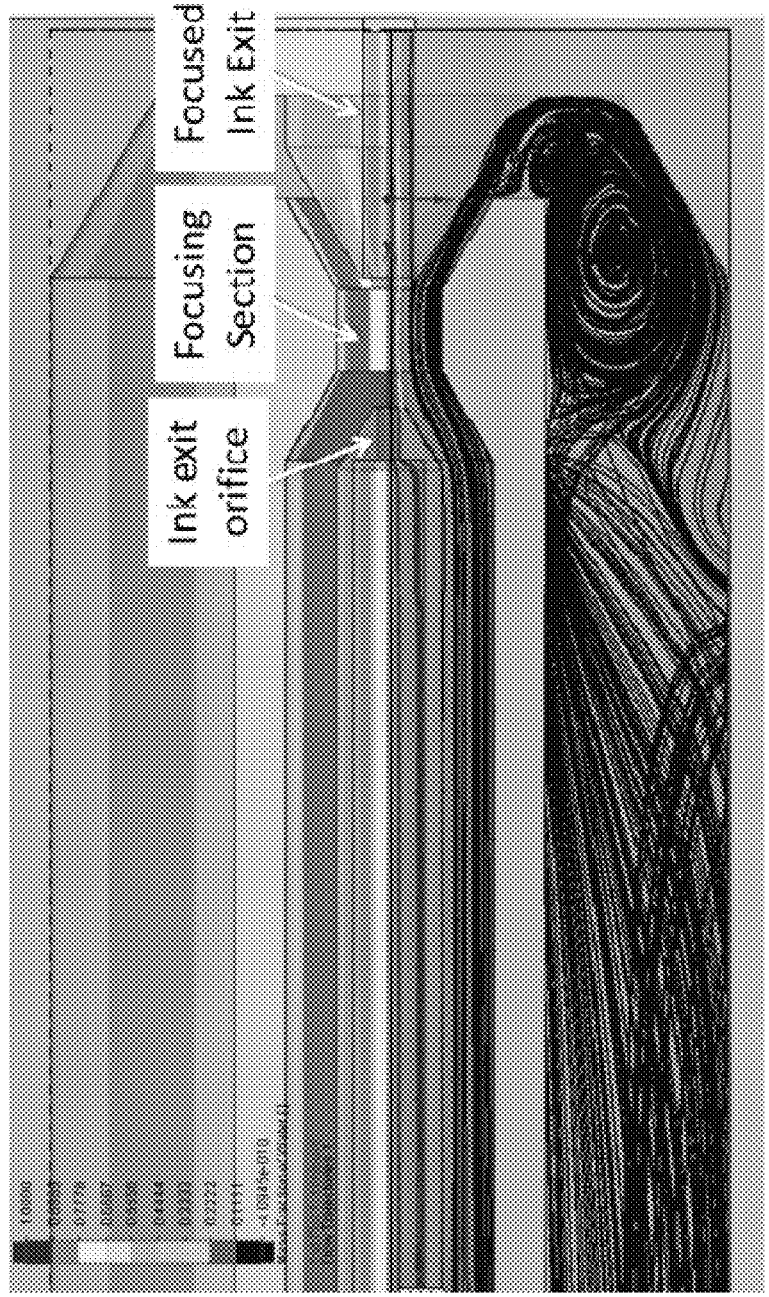
FIG. 6 is a cross-sectional side view of a model of the print head geometry showing fluid flow within the head.

Fluid flow modeling was performed on the head design shown in FIG. 5 using the Fluid Analysis plug in for SolidWorks. Since the model is cylindrically symmetrical, quarter symmetry of the model was used to reduce the calculation time in the simulations. Model conditions are given in Table 2. Analytical results from the fluid flow analysis of the print head geometry demonstrated that the sheath fluid could in fact be removed from the print flow stream before it is allowed to exit the print head. As shown in FIG. 6, the flow fields are fully laminar in the areas of interest and the portion of the sheath fluid that is stripped from the print stream is not mixed with the ink and so it can be recycled and reused for subsequent focusing operations. The total fluid flow rate (sheath+ink) into the print head was 3.06 sccm and the fluid flow rate out the head print nozzle was 0.58 sccm. The percentage of sheath fluid that is recycled is approximately 81%. Additionally, the print exit orifice was 250 μm which is preferred to minimize clogging and other reliability issues.

TABLE 2

Fluid flow model conditions.

| Item | Description |
|---|---|
| Ink exit orifice diameter | 100 μm |
| Focusing section diameter | 500 μm |
| Focused ink exit diameter | 250 μm |
| Ink flow rate | $1 \times 10^{-9}$ m$^3$/s |
| Sheath flow rate | $5 \times 10^{-8}$ m$^3$/s |
| Ink composition | Water |
| Sheath composition | Ethanol |

Figure 7:
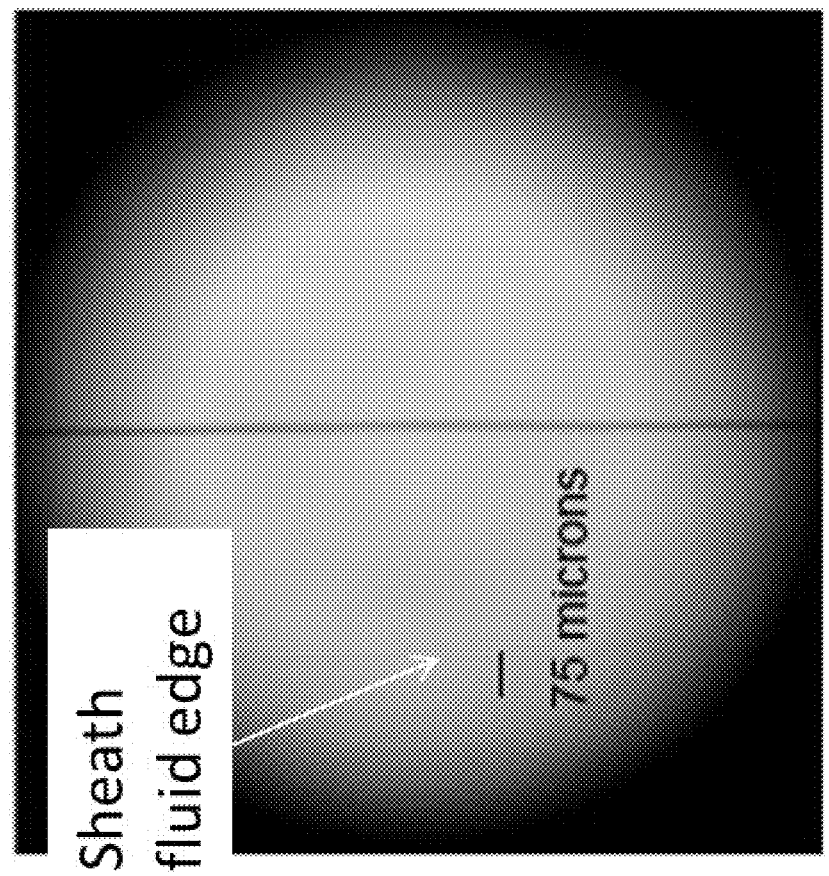
FIG. 7 shows PVP ink deposited on glass using a coaxial liquid jet.
Figure 8:
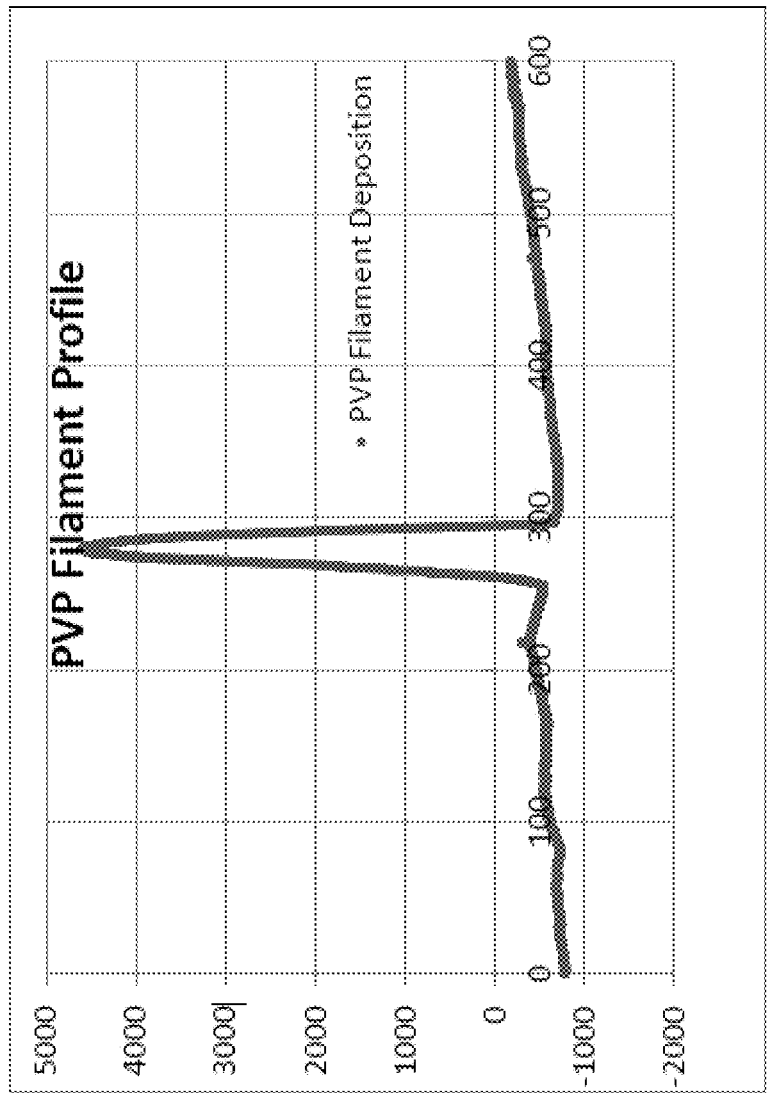
FIG. 8 shows the profile for printed PVP line shown in FIG. 7.

Finally, to understand the effects on printing of removing the sheath fluid from the print stream, printing tests were performed using the print head shown in FIG. 2. FIG. 7 shows a PVP trace deposited on glass using the coaxial liquid jet. The trace width is approximately 30 μm wide and approximately 0.5 μm thick. The trace was printed at 100 mm/s. The deposition of PVP shows good substrate wetting and good edge definition. Profiles of deposited PVP traces were measured using a contact profilometer. A representative profile is shown in FIG. 8. The profile shows a trace height of approximately 0.5 microns. The trace was deposited at a speed of approximately 100 mm/s. The very wide and flat profile of the trace suggests that spreading of the trace occurred upon contacting the print substrate. This is related to surface tension effects. Since the cross-section of the ink trace is approximately 15 μm$^2$, then, assuming a circular cross-section upon exiting the print head, an estimate of the ink filament diameter exiting from the print nozzle is approximately 2 μm. This demonstrates the ability of hydrodynamic focusing to create a fine filament of the core fluid. Successful printing without fully removing the sheath fluid indicates that the technology can be used to create a two or more material structure simultaneously. Examples of two material structures that can be created using this method include core and clad optical interconnects and insulated conductive traces. Subsequent post processing can also be used to remove the remaining sheath fluid from the print surface as needed.

The present invention has been described as a two-fluid hydrodynamic printing. It will be understood that the above description is merely illustrative of the applications of the principles of the present invention, the scope of which is to be determined by the claims viewed in light of the specification. Other variants and modifications of the invention will be apparent to those of skill in the art.

We claim:

1. An apparatus for two-fluid hydrodynamic printing, comprising:
   a print head, comprising:
      a coaxial tube assembly, comprising an inner tube having an exit orifice for flowing an ink stream therethrough and an annular outer tube for flowing a sheath fluid therethrough, wherein the sheath fluid has a higher velocity than the ink stream such that the ink stream and the sheath fluid do not mix and the ink stream is hydrodynamically focused by the outer sheath fluid in a focusing channel upon exiting from the exit orifice of the inner tube;
      a recirculation channel downstream from the focusing channel for removing at least a portion of the sheath fluid from the ink stream; and
      a print head exit orifice through which the focused ink stream exits the print head; and
   a substrate for deposition of the focused ink stream thereon.

2. The apparatus of claim 1, wherein the exit orifice of the inner tube is less than 100 μm in diameter.

3. The apparatus of claim 1, further comprising a focusing nozzle downstream from the exit orifice of the inner tube for further focusing of the ink stream therein.

4. The apparatus of claim 1, wherein the flow rate of the sheath fluid is at least 10× greater than the flow rate of the of the ink stream.

5. The apparatus of claim 1, wherein the sheath fluid comprises water, alcohol, or a combination thereof.

6. The apparatus of claim 1, wherein the ink stream comprises polyvinylpyrrolidone.

* * * * *